United States Patent [19]

von Tobel

[11] 4,000,158
[45] Dec. 28, 1976

[54] PHTHALOCYANINE COMPOUNDS

[75] Inventor: Hans von Tobel, Riehen, Switzerland

[73] Assignee: Sandoz Ltd., Basel, Switzerland

[22] Filed: Jan. 24, 1974

[21] Appl. No.: 436,062

[30] Foreign Application Priority Data

Feb. 1, 1973  Switzerland .................. 1407/73

[52] U.S. Cl. ........................ 260/314.5; 8/1 XA;
8/7; 8/54.2; 106/23; 428/458; 428/461;
162/162; 260/37 R
[51] Int. Cl.² ................................. C09B 47/08
[58] Field of Search .............. 260/314.5; 106/288

[56] References Cited

UNITED STATES PATENTS

| | | | |
|---|---|---|---|
| 2,153,740 | 4/1939 | Carleton et al. | 260/314.5 |
| 2,300,572 | 11/1942 | Hoyer et al. | 260/314.5 |
| 2,897,207 | 7/1959 | Bickendraht et al. | 260/314.5 |
| 3,010,970 | 11/1961 | Fiess | 260/314.5 |
| 3,042,683 | 7/1962 | Howard et al. | 260/314.5 |
| 3,082,213 | 3/1963 | Pugin et al. | 260/314.5 |
| 3,185,701 | 5/1965 | Tessandori et al. | 260/314.5 |
| 3,470,200 | 9/1969 | Anderson | 260/314.5 |

OTHER PUBLICATIONS

Moser, Phthalocyanine Compounds, pp. 230–238, Reinhold Pub. Corp., (1963).

*Primary Examiner*—John D. Randolph
*Attorney, Agent, or Firm*—Gerald D. Sharkin; Richard E. Vila; Joseph J. Borovian

[57] ABSTRACT

Disclosed are phthalocyanine dyes of formula

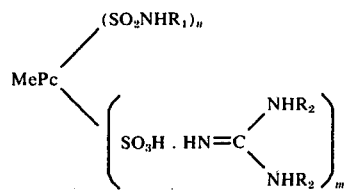

in which
Me signifies copper or nickel
Pc signifies a phthalocyanine radical,
the R₁'s, independently, signify a linear, branched or cyclic aliphatic radical, unsubstituted or substituted by chlorine, bromine, alkoxy, cyano, alkylcarbonyl, alkoxycarbonyl, benzoyl, alkylcarbonyloxy, alkoxycarbonyloxy or benzoyloxy,
the R₂'s, independently, signify a phenyl radical, unsubstituted or substituted by a chlorine or bromine atom or a nitro or cyano group or by up to two substituents selected from methyl, methoxy and ethoxy groups,
m signifies 1 or 2, and
n signifies 2 or 3,
the sum n + m being 3 or 4 and mixtures thereof, their production and use particularly in the dyeing of paper and plastics and in the production of surface coating media such as inks and lacquers.

5 Claims, No Drawings

PHTHALOCYANINE COMPOUNDS

The invention relates to phthalocyanine compounds. The invention provides compounds of formula I,

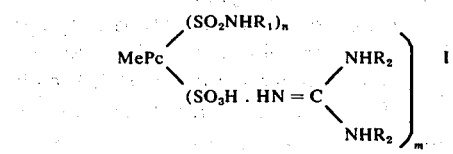

in which
- Me signifies copper or nickel
- Pc signifies a phthalocyanine radical,
- the $R_1$'s, independently, signify a linear, branched or cyclic aliphatic radical, unsubstituted or substituted by chlorine, bromine, alkoxy, cyano, alkylcarbonyl, alkoxycarbonyl, benzoyl, alkylcarbonyloxy, alkoxycarbonyloxy or benzoyloxy,
- the $R_2$'s, independently, signify a phenyl radical, unsubstituted or substituted by a chlorine or bromine atom or a nitro or cyano group or by up to two substituents selected from methyl, methoxy and ethoxy groups,
- $m$ signifies 1 or 2, and
- $n$ signifies 2 or 3,
- the sum $n + m$ being 3 or 4 and mixtures thereof.

In the compounds of formula I, the $R_1$'s preferably signify linear or branched alkyl radicals of 2 to 12 carbon atoms or cyclohexyl or methylcyclohexyl radicals, which radicals are unsubstituted or mono-substituted by a substituent selected from chlorine, bromine, alkoxy, cyano, alkylcarbonyl, alkoxycarbonyl, benzoyl, alkylcarbonyloxy, alkoxycarbonyloxy or benzyloxy, the alkoxy and alkyl radicals in such substituents preferably being of 1 to 4, more preferably 1 or 2 and most preferably 1, carbon atom.

Preferred compounds of formula I are the compounds of formula I',

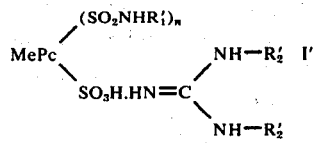

in which
- Me, Pc and $n$ are as defined above,
- the $R_1''$'s, independently, signify a cyclohexyl radical or a linear or branched chain alkyl radical of 3 to 8 carbon atoms, which alkyl radical is unsubstituted or substituted by an alkoxy group of 1 to 4 carbon atoms, and
- the $R_2''$'s signify a phenyl, toluyl or xylyl radical and mixtures of such compounds.

Still further preferred compounds of formula I are the compounds of formula I'',

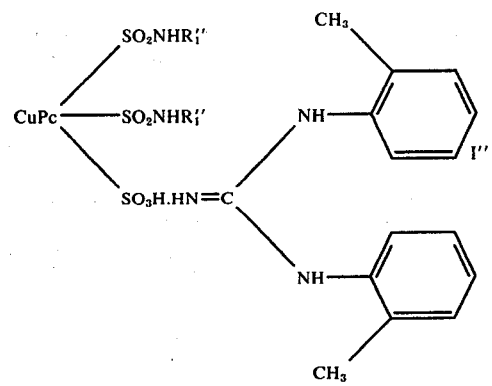

in which
- Pc is as defined above, and
- the $R_1'''$'s, independently, signify a linear or branched chain alkyl radical of 3 to 8 carbon atoms, unsubstituted or substituted by a methoxy group.

The compounds of formula I, and mixtures thereof, may be obtained by salifying a compound of formula II,

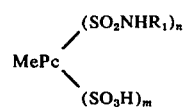

in which the $R_1$'s, $n$ and $m$ are defined above, or a mixture thereof, employing a compound of formula III,

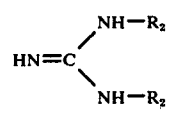

in which the $R_2$'s are as defined above, or a mixture thereof.

The process is preferably carried out in aqueous suspension. A preferred reaction temperature is from 0° to 100°, more preferably from 20° to 60° C. The pH of the suspension is preferably caused to lie in the range between 4 and 7. The suspension is preferably then neutralised and the compounds of formula I obtained by filtration. As will be appreciated, the mol ratio of compounds III to compounds II is preferably $m:1$.

The resulting compounds of formula I and mixtures thereof may be isolated and purified in conventional manner.

The compounds of formula II may be obtained by condensing a compound of formula IV,

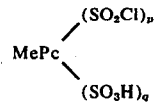

in which
- $p$ signifies 2, 3 or 4, and
- $q$ signifies 0, 1 or 2,
- the sum $p + q$ being 3 or 4, or a mixture thereof, with a compound of formula V,

R₁ — NH₂    V in which R₁ is as defined above, or a mixture thereof, and saponifying any remaining sulphochloride groups in the resulting compound.

The mol ratio of the compound (s) V to compounds IV is preferably about $n:1$.

The condensation is preferably carried out in aqueous suspension. A suitable reaction temperature is from 0° to 100°, preferably from 0° to 60° C. The aqueous medium is preferably weakly acid, neutral or alkaline, the pH thereof preferably lying in the range of 5 to 10.

The compounds of formula IV may be obtained in accordance with known methods, e.g. by heating the metal phthalocyanine in chlorosulphonic acid at a temperature of from 110° to 145°. On heating to about 115° C for a period of 3 hours, a product is obtained which contains, on average, 3 substituents per molecule. On heating to 135° C, a product is obtained which contains, on average, 4 substituents per molecule. The substituents are, in the main, sulphochloride groups, a small number being sulphonic acid groups. Any sulphonic acid groups may, if desired, be partly or completely converted into sulphochloride groups by reaction with, for example, thionylchloride. The compounds of formula V may be isolated by pouring on ice/water and subsequent filtration.

As will be appreciated, pure compounds of formula I may be obtained by using pure starting materials or by purification of mixtures. The mixtures of compounds of formula I may be obtained either by simple admixture of pure compounds of formula I or by employing mixed starting materials.

The compounds of formula I and the mixtures thereof are useful as dyes, particularly after washing, drying and conversion into finely granulated form by grinding in conventional manner. They belong to the class of so-called "spirit-soluble" dyes, being sparingly soluble in water but readily soluble in organic solvents.

They are particularly indicated for the following applications:

i. The dyeing of organic liquids, e.g. for the production of inks, particularly ball-point pen inks and the like, and especially for the production of air-drying, oven-drying or acid-hardening lacquers based on nitrocellulose and spirit soluble natural or synthetic resins.

ii. Dyeing of paper in the stock.

iii. The dyeing of plastics and synthetic resins in the mass, e.g. the dyeing of transparent cellulose film, polyethylene, acetylcellulose and polyester resins.

iv. Rubber printing v. Capsule lacquers vi. Lacquers of metal sheets, particularly aluminium.

vii. Production of spray wood dye.

For the above uses, the compounds of formula I, and mixtures thereof are used in conventional manner and in conventional amounts, depending on the particular compound or mixture and on the depth of shade required.

The compounds of formula I give blue dyeings which have notable light fastness, transparency, heat resistance and particularly good solubility in alcohols and ketones.

The invention is illustrated by the following Examples, in which all parts and percentages are by weight and the temperatures in degrees Centigrade.

EXAMPLE 1

57.6 Parts of copper phthalocyanine are entered into 270 parts of chlorosulphonic acid and the mixture is heated to 115° over the course of 3 hours with stirring. The temperature is then lowered to 80°–85°, 15 parts of thionyl chloride are added slowly, the mixture is stirred at 85° for 2 hours and poured on an ice/water mixture. The unsoluble copper phthalocyanine which contains on an average about 3 sulphochloride groups per molecule, is filtered off and well washed with acidified ice water. The residue is subsequently stirred into 600 parts of ice water, 18 parts of methoxypropylamine are added and the pH is adjusted to 9 by the careful addition of sodium hydroxide solution. The temperature is raised to 60° over the course of 3 hours with stirring, and the pH is kept at 9 by the continuous addition of sodium hydroxide solution. When the reaction is complete, the pH is acidified to 5 with hydrochloric acid.

23.9 Parts of N,N'-di-ortho-toluylguanidine are stirred into 200 parts of water, the pH is adjusted to 1 by the addition of hydrochloric acid, the solution is filtered and the pH is adjusted to 4 by the addition of crystalline sodium acetate. The resulting solution is poured at 50° to the dye suspension. The mixture is stirred at 50° for 2 to 3 hours and the pH is adjusted to 7 by the addition of sodium bicarbonate. The dye which corresponds to formula

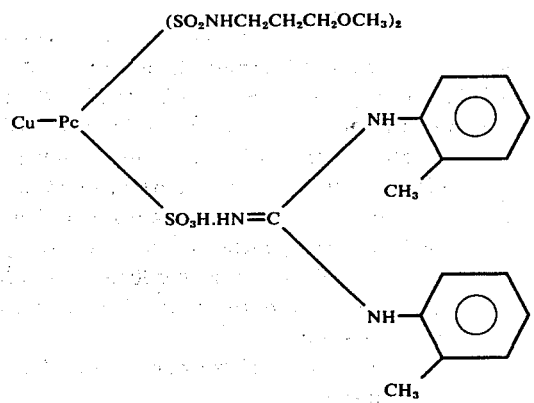

is filtered off, washed with water until salt free and dried at 80° under vacuum. After grinding according to conventional methods, the blue powder may be used for the above-mentioned purposes.

EXAMPLE 2

Replacing the 57.6 parts of copper phthalocyanine by the equivalent amount of nickel phthalocyanine, a dye with a slightly more greenish shade is obtained. Its dyeing properties closely resemble those of the dye described in Example 1.

EXAMPLE 3

Following the procedure of Example 1 but replacing the 18 parts of methoxypropylamine by 9 parts of methoxypropylamine and 13 parts of 2-ethylhexylamine, a dye is obtained which consists of a mixture of the compounds of formulae

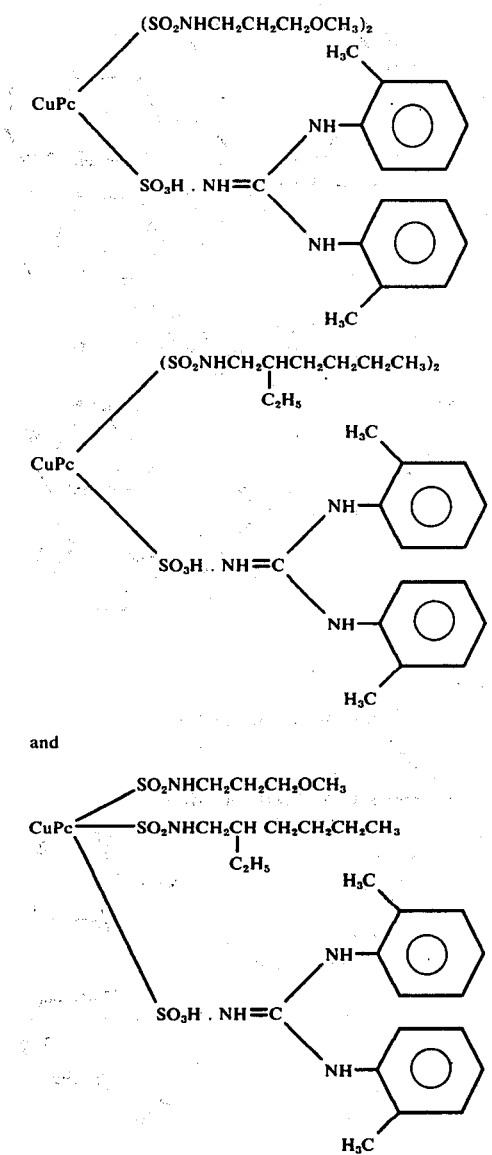

In dyeing properties it closely resembles the dye produced in accordance with Example 1.

EXAMPLE 4

Following the procedure effected in accordance with Example 1 but raising the temperature from 115° to 135° in the course of sulphochlorination and replacing the 18 parts of methoxypropylamine by 27 parts thereof, a dye is obtained which contains approximately 3 groups of formula — $SO_2NHCH_2CH_2CH_2OCH_3$. This dye gives dyeings of a more greenish shade and in its dyeing properties it closely resembles the dye produced in accordance with Example 1.

The dyes of the following Examples are produced in analogy with the operating procedure described in Example 1 but the 18 parts of methoxypropylamine are replaced by equivalent amounts of the following amines. In their dyeing properties the resulting dyes closely resemble the dye produced in accordance with Example 1.

| Example No. | Amine |
|---|---|
| 5 | cyclohexylamine |
| 6 | ethoxypropylamine |
| 7 | n-propoxypropylamine |
| 8 | n-butoxypropylamine |

Replacing in Example 1 23.9 parts of N,N'-di-ortho-toluyl-guanidine by equivalent amounts of the guanidines indicated in the following Examples, dyes are obtained which in their dyeing properties closely resemble the dye produced in accordance with Example 1.

| Example No. | Guanidine |
|---|---|
| 9 | N,N'-diphenylguanidine |
| 10 | N,N'-bis-(3,5-dimethyl-phenyl)-guanidine |

APPLICATION EXAMPLES

1. To a mixture consisting of
   28 parts of oil-free alkyd-resin 100%, commercial,
   26 parts of 1,2-propadiol,
   20 parts of benzyl alcohol,
   21.5 parts of 2-ethyl-1,3-hexadiol and
   4.5 parts of oleic acid
are added 35 parts of the dye obtained in accordance with Example 1. The mixture is heated to 140° over the course of 30 minutes while stirring. Thus, a blue high quality ink for ball point pens is obtained.

2. To a mixture consisting of
   13 parts of a commercial vinyl polymer (mixture of polyvinylchloride and polyvinylacetate),
   6.5 parts of commercial acrylic resin,
   6.5 parts of dioctylphthalate,
   25 parts of toluene,
   40 parts of methyl ethyl ketone and
   10 parts of ethylene glycol
are added slowly at room temperature and while stirring, 5 parts of the dye obtained in accordance with Example 3. The solution is obtained easily and quickly and thus, the resulting blue "vinyl sheet lacquer" is ready for immediate use.

What is claimed is:
1. A compound or mixture of compounds of formula I'

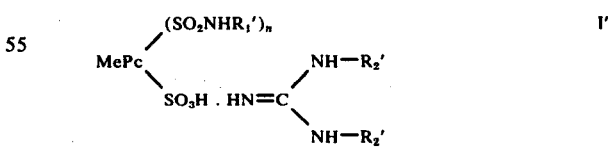

wherein
Me is copper or nickel,
Pc is a phthalocyanine radical,
the $R_1'$'s, independently, are cyclohexyl, linear or branched chain alkyl of 3 to 8 carbon atoms or linear or branched chain alkyl of 3 to 8 carbon atoms monosubstituted by alkoxy of 1 to 4 carbon atoms, the $R_2''$'s, independently, are phenyl, toluyl or xylyl, and $n$ is 2 or 3.

2. A compound or mixture of compounds of claim 1, wherein any alkoxy is methoxy.

3. A compound or mixture of compounds of claim 2 and of formula I''

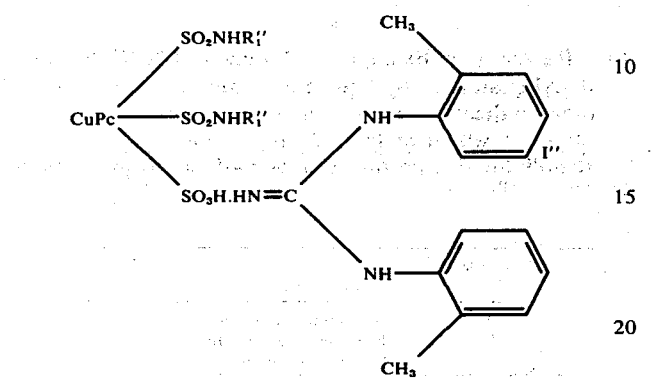

in which
Pc is as defined in claim 2, and
the $R_1'''$'s, independently, are a linear or branched chain alkyl radical of 3 to 8 carbon atoms, unsubstituted or substituted by methoxy.

4. A compound of claim 3 and of formula

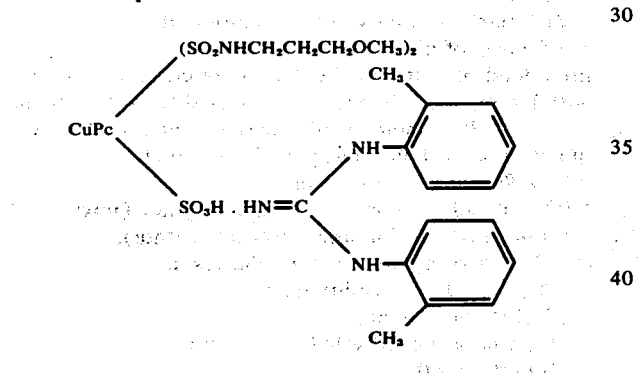

5. A mixture of compounds of claim 3, the compounds in said mixture being of formulae

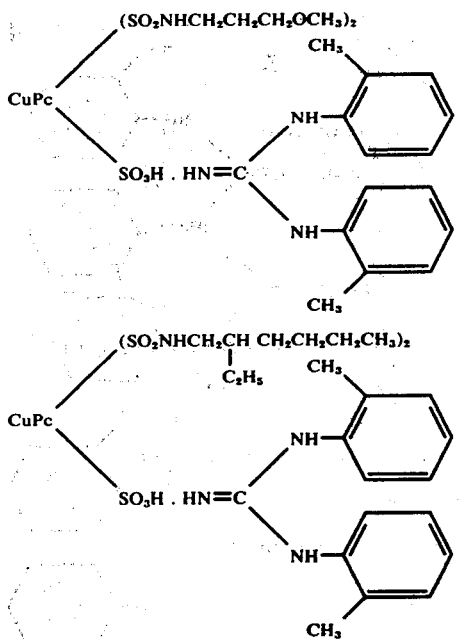

and

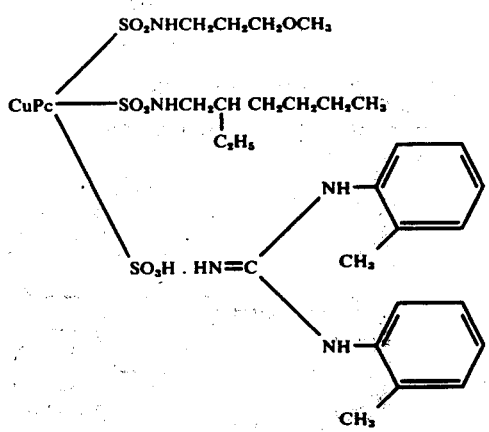

* * * * *